J. L. ANDERSON.
AUTOGENOUS WELDER.
APPLICATION FILED FEB. 17, 1920. RENEWED OCT. 19, 1922.
1,438,285.
Patented Dec. 12, 1922.
2 SHEETS—SHEET 2.
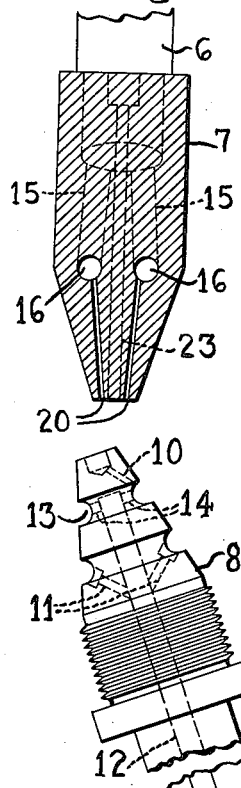
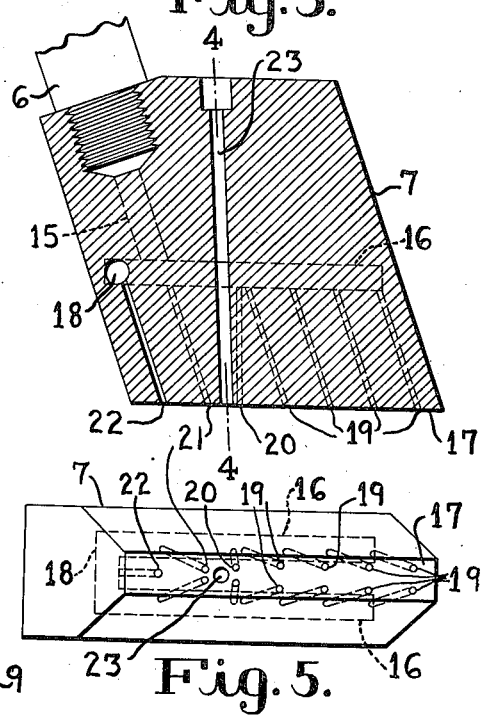
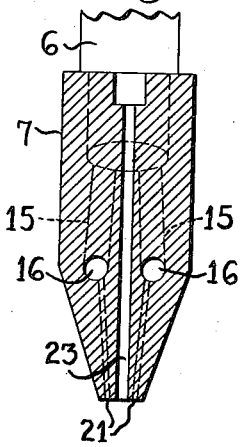
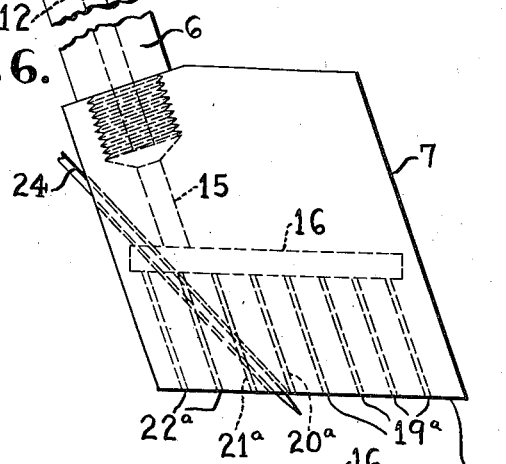
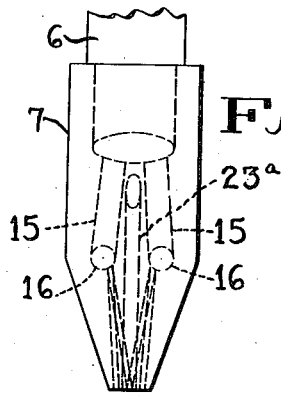
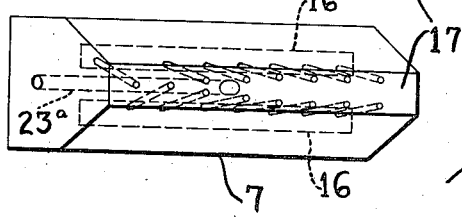

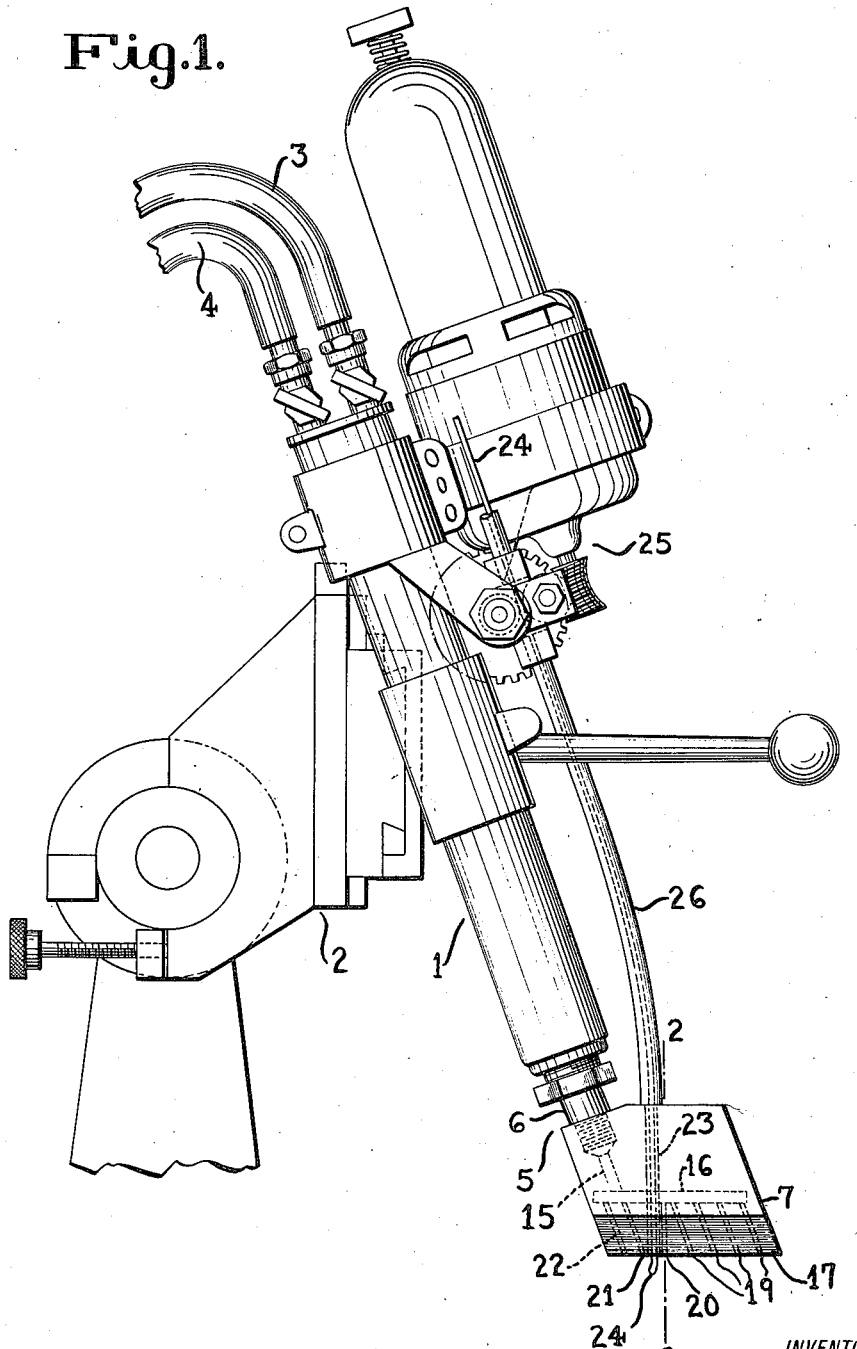

Patented Dec. 12, 1922.

1,438,285

UNITED STATES PATENT OFFICE.

JAMES L. ANDERSON, OF BAYONNE, NEW JERSEY, ASSIGNOR, BY MESNE ASSIGNMENTS, TO AIR REDUCTION COMPANY, INCORPORATED, OF NEW YORK, N. Y., A CORPORATION OF NEW YORK.

AUTOGENOUS WELDER.

Application filed February 17, 1920, Serial No. 359,462. Renewed October 19, 1922. Serial No. 595,678.

*To all whom it may concern:*

Be it known that I, JAMES L. ANDERSON, a citizen of the United States, and resident of Bayonne, in the county of Hudson and State of New Jersey, have invented a new and useful Autogenous Welder, of which the following is a specification.

The invention relates to autogenous flame welding, and is an improvement in multiple-jet welding torches adapted for manufacturing operations wherein the torch and work are mechanically supported in definite relation and one of them is mechanically driven at definite speeds lengthwise of the seam. In the welding of tubing the walls of which are not too heavy, and in other cases where the seam is not too deep for penetration, the edges are simply held in abutting or opposed relation and progressively fused together, transverse compression being used if necessary to insure the desired fullness of weld. In hand welding of comparatively heavy sections, the edges of which are first beveled, or where it is impossible to secure sufficient thickness in the weld by compression, it is customary to add metal to the seam while in fusion from the end of a wire or rod melted by the flame of the single-jet tip. This has also been adapted for mechanical welding, the wire being fed adjacent the tip so that its end receives the heat; but it has not been possible to attain economical speeds or advantageously to apply the heating simultaneously to the seam and wire. This invention comprises a tip containing supply chambers and jet passages for the oxyacetylene or like mixture, and a separate, through wire channel, whereby the wire is made available in connection with efficient groupings or arrangements of jets. The wire is thus conducted to a region intermediate the ends of a seamwise extended heating area, amongst or preceded and followed by jets of differentiated functions, so that the seam will be heated and fused and the wire melted and combined with the weld to the best effect for the particular purpose in view. The invention may be advantageously applied in connection with the principle of spread-flame welding involved in my applications Serial Nos. 317,281 and 317,282 of August 13, 1919, and 342,768 and 342,770 of December 5, 1919.

In the accompanying drawings showing illustrative embodiments of the invention:

Fig. 1 is a side elevation of a mechanically supported torch formed and equipped for wire feeding;

Fig. 2 is a transverse section through the tip block on the line 2—2 of Fig. 1;

Fig. 3 is a section through the block in the central vertical longitudinal plane;

Fig. 4 is a transverse section on the line 4—4 of Fig. 3;

Fig. 5 is a bottom plan view, looking at the delivery face of the tip;

Fig. 6 is a side elevation of another form of tip block embodying the invention, showing also the stem of the tip;

Fig. 7 is a front end elevation of the tip block of Fig. 6, indicating the manner of welding the seam; and Fig. 8 is a bottom plan of this form of tip block.

Fig. 1 shows a torch body 1 supported on an adjusting bracket 2. Oxygen and the combustible constituent of the autogenous welding flame mixture are supplied under pressure through flexible connections 3, 4, as usual, to the rear or upper end of the body, in which they flow through suitable conduits to the provisions whereby they are mixed in proper proportions for the flame. The invention does not depend upon the specific character of these provisions, or upon the particular construction of the torch aside from the matters involved in the tip-block. Different types of torches are known, that preferred being of the interchangeable-mixing-tip style. The oxygen and acetylene may accordingly be understood as flowing through separate conduits in the body to a socket or joint element at the lower end, where the gases pass into the removable tip 5, wherein for the first time they are brought together. A machine torch tip of this kind comprises characteristically a stem 6 containing the ports and passages for proportioning and introducing the gases, and a nozzle block 7, flattened laterally and elongated seamwise or parallel with the delivery face, containing the distributing chambers and capillary jet passages. The rear end of the stem is formed as a joint member 8 for sealing engagement with the socket of the body under the clamping action of a nut 9, and has metering inlet ports 10 and 11 whereby the gases are controllably admitted to a longitudinal main or common channel 12 (see Fig. 6). The special form of the introducing means designed to overcome flashbacks, including the restricted diagonal oxygen port or ports 10 delivering into a large circumferential chamber 13, whence the oxygen is admitted through relatively ample radial ports 14 to the rear of the main channel, which does not extend through to the back end of the tip, and the inclined acetylene ports opening farther along into the main channel, constitutes the invention of another, and is not claimed herein.

The lower end of the stem is joined to the top of the nozzle block, wherein the now more or less thoroughly mixed gases pass to a pair of branch channels 15, which communicate in turn with two manifold chambers 16 spaced apart laterally at opposite sides of the central vertical longitudinal plane and extending lengthwise in the block over the elongated delivery face 17. From these spaced manifolds, and from a cross-chamber 18 which may connect their rear portions, capillary jet passages 19, 20, 21, 22 (Figs. 2–5) extend downwardly to the delivery face, through which they open, the jet passages being of sufficient length to remove the supply chambers of relatively large capacity from the region of intense heat.

In the central vertical longitudinal plane of the block, between the manifold chambers 16 and out of communication with the jet passages, is a wire channel 23, which in the form shown in Figs. 1 to 5 passes approximately vertically downward from the top to the bottom of the block. A welding wire is fed to and through this channel by a wire-feeding mechanism 25 forming the subject-matter of a separate application, the wire being withdrawn from a suitable supply and passed through a tube 26 leading from the feeding instrumentalities to the entrance of the channel in the block, where the lower end of the tube is secured.

The jet passages 19, 21 and 22 are shown as inclining forwardly and downwardly in the tip, in lateral projection, though this is not essential, and the passages 19, 20 and 21, leading from the spaced manifolds, may converge somewhat toward the center in end projection, though this may also be varied. It is to be understood that the portion of the block containing the passages 19 is its forward portion and the part containing the passages 21, 22 its rear portion.

The ends of the passages 19 form two longitudinal rows of jet orifices in advance of the exit of the wire channel. The number and spacing of these passages is subject to variation according to the work to be performed. Their jets preheat the succeeding fresh portions of the unwelded seam as the work or torch travels and bring the metal to or toward the welding point, the parts being so proportioned that the metal of the seam is in fusion approximately beneath the wire exit. The lateral spreading of the intense heating of the jets across the seam possesses the advantages set forth in my applications Serial Nos. 317,281 and 317,282 heretofore referred to, and is of special value in melting down the sides of chamfered seam grooves. The invention is not necessarily limited, however, in all instances to spreading of the jets, nor is it absolutely essential that all the jets to be delivered from round bores, as slits can be used in place of holes, as mentioned in my former applications.

The pair of jet passages 20 are arranged to deliver their jets immediately in front of the protruding end of the wire, heating it by radiation, while the pair of passages 21 are formed to converge upon the wire from behind. This group of jets continually melts off the end of the wire as it is fed through the channel 23 and completes the fusion of the sides and bottom of the seam, mingling the metal from both sources in one molten mass to form a substantially homogeneous cast union. The full weld thus formed may be too high or may be gouged at the sides, and this condition is rectified by one or more central smoothing jets after the manner of my applications Serial Nos. 342,768 and 342,770 aforesaid. One such jet passage 22 is shown, leading from the rear manifold chamber 18.

In Figs. 6, 7 and 8 the wire channel 23$^a$ enters through the rear face of the nozzle block and extends diagonally downward and forward, guiding the end of the wire obliquely to the jet passages 20$^a$ which have their orifices directly in front of its exit. These passages are also shown inclining forwardly, but at a higher angle than the wire channel. The spaced series of forward jet passages 19$^a$ are substantially as shown in the other form. A pair of forwardly and inwardly inclined jet passages 21$^a$ are shown delivering close behind the end of the wire channel; while in rear of them are two passages 22$^a$, one behind the other, arranged to deliver their jets substantially in the longitudinal central line. These jets may incline laterally inward, alternately from the two manifolds, without materially altering the action. The manifolds in this instance are not joined by a cross-chamber. Numerous other arrangements may be devised. I have found that with a construction such as shown in Figs. 6 to 8, in which the wire converges upon one or more melting-off jets in front it, a specially advantageous consumption of the wire and its incorporation with the weld are obtained.

What I claim as new is:

1. An autogenous welder having provisions for bringing together oxygen and the combustible gas and characterized by a tip portion containing multiple jet passages for delivering the mixture and a separate wire channel therethrough amongst the jet passages, substantially as set forth.

2. An autogeneous welder having provisions for bringing together oxygen and the combustible gas and characterized by a tip portion containing multiple jet passages for delivering the mixture and a separate wire channel therethrough, the wire passage and one or more of the jet passages being in converging relation, substantially as set forth.

3. An autogenous welding torch tip containing a longitudinally extending transversely spread arrangement of jet passages, and a channel for guiding a wire to the flame intermediate the ends of the group of passages and in the central longitudinal plane, substantially as set forth.

4. An autogenous welder comprising an oblong nozzle block containing a forward laterally spread group of jet passages, a central wire channel in rear thereof, and one or more substantially central jet passages in rear of the wire channel, substantially as set forth.

5. An autogenous welder containing jet passages and a wire channel, the wire channel being forwardly and downwardly inclined in converging relation to one or more jet passages having their orifices directly in front of its exit, substantially as set forth.

6. An autogenous welding torch tip comprising an oblong block containing laterally spaced manifold chambers with jet passages leading therefrom to the delivery face, and a wire channel passing between said manifold chambers, substantially as set forth.

JAMES L. ANDERSON.